(12) United States Patent
van Walraven

(10) Patent No.: US 7,905,694 B2
(45) Date of Patent: Mar. 15, 2011

(54) SECURING ASSEMBLY

(75) Inventor: Jan van Walraven, Mijdrecht (NL)

(73) Assignee: J. van Walraven Holding B.V., Mijdrecht (NL)

( * ) Notice: Subject to any disclaimer, the term of this patent is extended or adjusted under 35 U.S.C. 154(b) by 614 days.

(21) Appl. No.: 11/866,205

(22) Filed: Oct. 2, 2007

(65) Prior Publication Data

US 2009/0087282 A1    Apr. 2, 2009

(51) Int. Cl.
*F16B 37/04* (2006.01)
(52) U.S. Cl. .......................................... 411/85
(58) Field of Classification Search .............. 411/84, 411/85, 349, 549, 550, 354
See application file for complete search history.

(56) References Cited

U.S. PATENT DOCUMENTS

| | | | |
|---|---|---|---|
| 3,432,197 A | | 3/1969 | Albertine et al. |
| 3,434,748 A | | 3/1969 | Leurent |
| 4,146,074 A | * | 3/1979 | Kowalski .................. 411/111 |
| 4,285,379 A | * | 8/1981 | Kowalski .................. 411/85 |
| 4,460,299 A | * | 7/1984 | Kowalski .................. 411/85 |
| 4,545,697 A | * | 10/1985 | Verdenne et al. ............ 403/230 |
| 5,489,173 A | * | 2/1996 | Hofle ..................... 411/85 |
| 5,655,865 A | * | 8/1997 | Plank et al. .............. 411/85 |
| 7,044,701 B2 | * | 5/2006 | Herb ..................... 411/84 |
| 7,073,995 B2 | * | 7/2006 | Herb ..................... 411/85 |
| 7,101,131 B2 | * | 9/2006 | Herb ..................... 411/84 |
| 2003/0185643 A1 | | 10/2003 | Thompson |

FOREIGN PATENT DOCUMENTS

EP  1039153 A1  3/2000

* cited by examiner

*Primary Examiner* — Flemming Saether
(74) *Attorney, Agent, or Firm* — Browdy and Neimark, PLLC

(57) ABSTRACT

The invention relates to a securing assembly for securing an object to a profiled element with flanges which delimit a longitudinal slot between them. The securing assembly comprises a metal bearing element which is designed to bear against the outside of the profiled element, an elongate metal anchoring part which is situated on the bottom side of the bearing face of the bearing element, and a support for the anchoring part, which support is provided with one or more spring members and is optionally removably connected to the bearing element and which support supports the anchoring part resiliently in such a manner that the anchoring part can be moved up and down with respect to the bearing element. The securing assembly and its anchoring part can be aligned with the longitudinal slot and the anchoring part can be introduced into the profiled element through the longitudinal slot in such a manner that after rotation of the securing assembly the anchoring part extends at an angle, preferably substantially at right angles, with respect to the longitudinal slot, and the anchoring part grips behind the flanges of the profiled element. The securing assembly furthermore comprises a wedge mechanism which is effective between the bearing element and anchoring part. When the wedge mechanism is operated, the anchoring part is pushed down with respect to the bearing element in such a manner that the flanges of the profiled element can be accommodated in accommodation spaces between the bearing element and anchoring part when the securing element is rotated.

14 Claims, 6 Drawing Sheets ic bearing element which has a bearing face which is designed to bear against the outside of the profiled element. Furthermore the securing assembly comprises an elongate metal anchoring part which is situated on the bottom side of the bearing face of the bearing element and has axial end parts. Also the securing assembly comprises a support for the anchoring part, which support is provided with one or more spring members and is optionally removably connected to the bearing element and which support supports the anchoring part resiliently in such a manner that the anchoring part can be moved up and down with respect to the bearing element. An accommodation space is present between the bearing element and each axial end part of the anchoring part, which accommodation space is accessible from the side of the securing assembly and is designed for accommodating a flange of the profiled element. The securing assembly and its anchoring part can be aligned with the longitudinal slot and the anchoring part can be introduced into the profiled element through the longitudinal slot. Subsequently, after rotation of the securing assembly, preferably through a quarter turn, the anchoring part—in a pre-fitting state—extends at an angle, preferably substantially at right angles, with respect to the longitudinal slot, so that the flanges are in the accommodation spaces and the anchoring part grips behind the flanges of the profiled element, with the support clamping the flanges of the profiled element between the anchoring part and the bearing element.

Such an assembly is known from WO 2007/008060 A1 in the name of the Applicant. It should be noted that the term C-shaped profiles is also understood as referring to so-called strut profiles, in which the flanges have inwardly bent tips.

SUMMARY OF THE INVENTION

It is an object of the invention to provide an alternative securing assembly.

This object is achieved according to the invention by a securing assembly for securing an object to a profiled element with flanges which delimit a longitudinal slot between them in particular a profiled element of the C-profile type, which securing assembly comprises a metal bearing element which has a bearing face which is designed to bear against the outside of the profiled element; an elongate metal anchoring part which is situated on the bottom side of the bearing face of the bearing element and has axial end parts; and a support for the anchoring part, which support is provided with one or more spring members and is optionally removably connected to the bearing element and which support supports the anchoring part resiliently in such a manner that the anchoring part can be moved up and down with respect to the bearing element. There is an accommodation space between the bearing element and each axial end part of the anchoring part. Said accommodation space is accessible from the side of the securing assembly and is designed for accommodating a flange of the profiled element in such a manner that the securing assembly and its anchoring part can be aligned with the longitudinal slot and the anchoring part can be introduced into the profiled element through the longitudinal slot and in such a manner that subsequently, after rotation of the securing assembly, preferably through a quarter turn, the anchoring part—in a pre-fitting state—extends at an angle, preferably substantially at right angles, with respect to the longitudinal slot, so that the flanges are in the accommodation spaces and the anchoring part grips behind the flanges of the profiled element, with the support clamping the flanges of the profiled element between the anchoring part and the bearing element. The securing assembly furthermore comprises a wedge mechanism which is effective between the bearing element and anchoring part. The wedge mechanism comprises at least one wedge element which can be introduced between the bearing element and the anchoring part. The wedge element engages with the anchoring part and with the bearing element in such a manner that when the wedge mechanism is operated, the anchoring part is pushed down with respect to the bearing element and the flanges of the profiled element can be accommodated in the accommodation spaces when the securing element is rotated.

In the unloaded state, the distance between the bearing element and the anchoring part at the location of the accommodation spaces is smaller than the thickness of the flanges of the profiled element. After the anchoring part has been introduced into the slot of the profiled element, the wedge element is pressed between the bearing element and the anchoring part. Due to the wedge action, the bearing element and the anchoring part are pushed apart and the distance between them is increased to such an extent that the securing assembly can be rotated, with the anchoring part gripping behind the flanges. When the wedge element is withdrawn, the spring members push the anchoring part and the bearing element towards one another again, so that the anchoring part and the bearing element engage with the flanges in a clamping manner. The clamping action of one or more spring members is preferably such that it is possible to move the assembly along the profiled element by hand.

Preferred embodiments of the invention are defined in the dependent claims.

The invention will be explained below in more detail by means of a number of exemplary embodiments with reference to the drawing.

DETAILED DESCRIPTION

Figure 1:
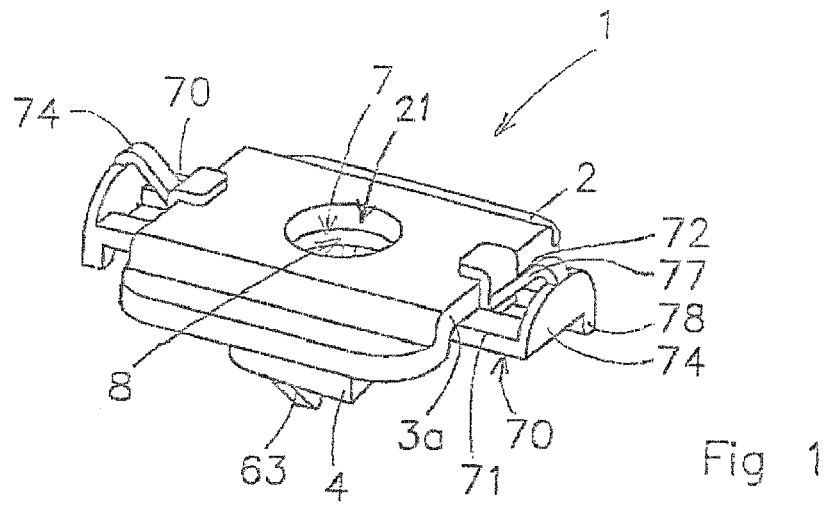
FIGS. 1-4 show a perspective view, a top view, a side view and a front view, respectively, of a preferred embodiment of a securing assembly according to the invention.
Figure 2:
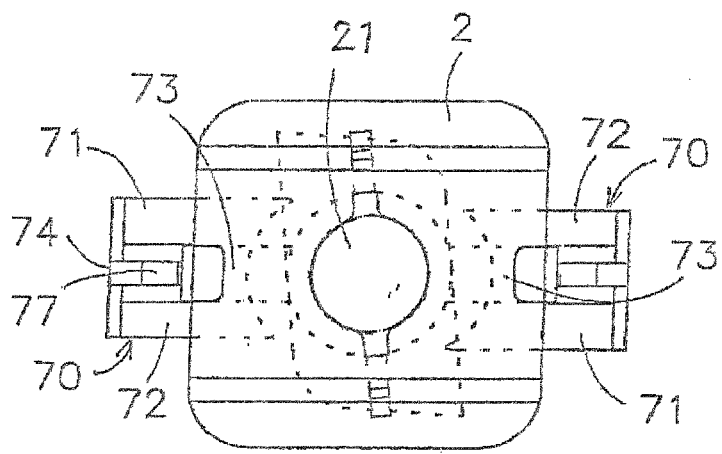
Figure 3:
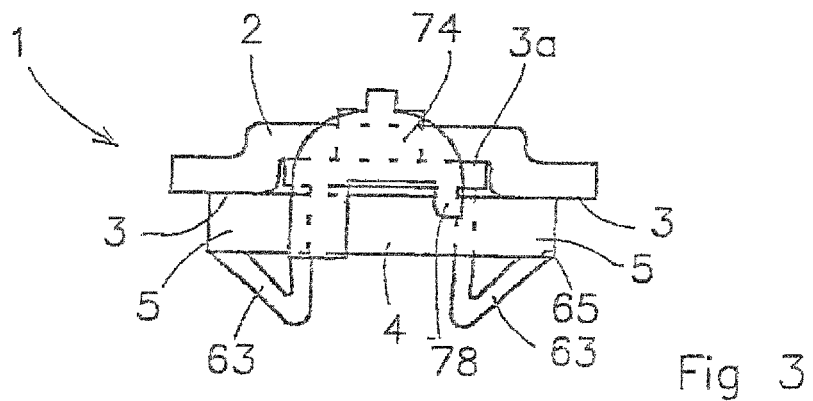
Figure 4:
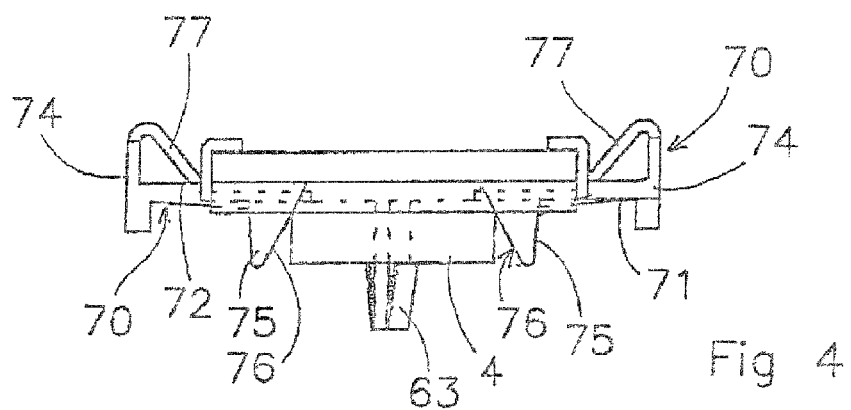

FIGS. 1-4 show a securing assembly 1 comprising a metal bearing element 2, which has a bearing face 3 which is designed to bear against the outside of a profiled element. The bearing element is substantially plate-shaped and, in the illustrated embodiment, has a central opening 21. In the illustrated embodiment, the bearing element 2 furthermore has a central area 3a which is recessed with respect to the bearing face 3, but could also be flat. Furthermore, the assembly 1 comprises an elongate metal anchoring part 4, which is situated on the bottom side of the bearing face 3 of the bearing element 2 and has axial end parts 5. The anchoring part 4 has a central threaded bore 7 which extends from the upper side to the bottom side through the anchoring part 4. Adjoining the bore 7, two apertures 8 are provided which are diametrically opposite one another and extend from the upper side to the bottom side of the anchoring part 4. It should be noted that the anchoring part does not necessarily have to be designed as a nut with a central bore as is shown in the embodiments illustrated, in which a threaded end can be screwed into the bore, but that the anchoring part could, for example, also be designed as a threaded end or rod-shaped body attached by welding, riveting or another method.

The assembly 1 furthermore comprises a support 6 for the anchoring part 4. The support 6 is preferably made of plastic and is connected to the bearing element 2 and supports the anchoring part 4.

Figure 5:
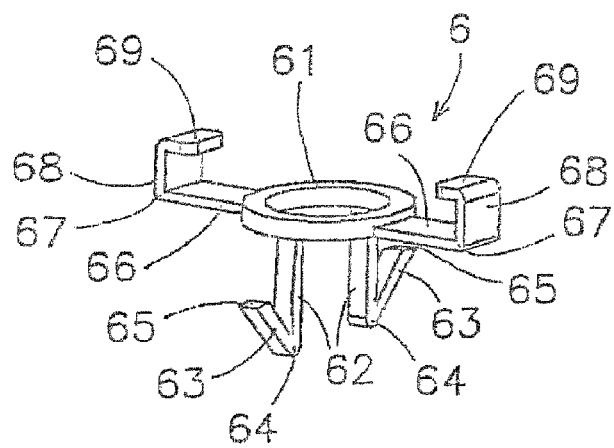
FIG. 5 shows a perspective view of a support of the securing assembly from FIG. 1.

The support 6, which is illustrated separately in FIG. 5, in this embodiment comprises an annular base body 61 which, in the assembled state (FIGS. 1-4), bears against the bottom side of the bearing element 2. Two legs 62 extend downwards from the annular base body 61 and, in the assembled state (FIGS. 1-4), extend through the anchoring part 4, with the legs 62 being accommodated in the apertures 8 in the anchoring part 4. At the bottom end of the legs 62, a hook member 63 is in each case provided which is connected to the leg 62 by means of a flexible hinge point. In the illustrated example, the hook member 63 extends in a direction corresponding to the longitudinal direction of the anchoring part 4 and upwards, so that the free end 65 of the hook member 63 engages with the anchoring part 4 and supports the latter. However, the hook member could also extend, for example, in the transverse direction of the anchoring part. One aspect of the invention which can also be applied separately from the present invention is the fact that the hook members 63, in the form as illustrated, have the advantage that they can be introduced more easily through the central opening 7 and the adjacent apertures 8 in the anchoring part 4 during assembly of the assembly 1 than, for example, solid projections, as are known from the prior art.

The support furthermore has two arms 66 which extend diametrically from the base body 61 in the transverse direction of the anchoring part 4. At the end 67 of the arms 66, which end is remote from the base body 61, an upright end edge 68 is in each case provided which extends from the arms upwards and, in the assembled state, runs along the edge of the bearing element 2, as can be seen in FIG. 1. At the free end of the upright end edge 68, a gripping lip 69 is provided which grips over the edge of the bearing element 2 and holds the latter securely.

The securing assembly 1 furthermore comprises a wedge mechanism comprising two operable bodies 70. The operable bodies 70 have two substantially parallel legs 71 and 72, which are connected at one end by a bridge part 73 and at the opposite end by an actuating member 74. One of the legs 71, 72 is provided with a wedge element 75. The wedge element 75 has a sloping wedge face 76 which engages with the edge of the anchoring part 4. A spring lip 77 is integrally formed on the actuating member 74 and engages with one end 78 on the end edge 68 of the support 6. In the assembled state, the bridge part 73 is accommodated in a space which is delimited by the arm 66, the end edge 68 and the base body 61 of the support 6 and the bearing element 2, in such a manner that it can be moved past the arm 66.

The securing assembly 1 operates as follows:

The anchoring part 4 of the securing assembly 1 is aligned with the longitudinal slot of a profiled element (not shown). Subsequently, the actuating members 74 of the wedge mechanism are pressed towards one another by the fitter between thumb and index finger. As a result thereof, the wedge elements 75 are pressed inwards, as a result of which the wedge faces 76 slide along the edges of the anchoring part 4 and the anchoring part 4 is moved away from the bearing element by the wedge action. Between the bearing element 2 and the anchoring part 4 a distance is now created which is such that an accommodation space is created between the bearing element 2 and each axial end part 5 of the anchoring part 4 which is accessible from the side of the securing assembly 1. Each of the accommodation spaces serves to accommodate a flange of the profiled element.

After the bearing element 2 and the anchoring part 4 have been moved apart, the anchoring part 4 can be introduced into the profiled element through the longitudinal slot in such a manner that subsequently, after rotation of the securing assembly 1, preferably through a quarter turn, the anchoring part 4—in a pre-fitting state—extends at an angle, preferably substantially at right angles, with respect to the longitudinal slot, so that the flanges are in the accommodation spaces and the anchoring part 4 grips behind the flanges of the profiled element.

When the bearing element 2 and the anchoring part 4 are moved apart, a spring force is generated in the support 6 in one or more locations. This can be achieved in various ways through deformation of one or more parts of the support 6.

Firstly, a spring force can be generated by bending the hook members 63 with respect to the legs 62.

Secondly, as a result of the bearing element 2 and the anchoring part 4 being moved apart, the annular base body 61 can be pulled along with the anchoring part 4 via the legs 62, so that it comes off the bearing element 2. However, the ends of the arms 66 remain pressed against the bearing element 2 through the upright end edge 68 and the gripping lip 69, as a result of which the arms 66 are bent and a spring force is generated therein.

As described above, the spring force can be generated in both locations simultaneously as a result of which the spring members of the assembly 1 are formed by the arms 66 and the hook members 63. However, it is also possible that the arms 66 are of rigid design and only the hook members 63 can be deformed. In that case the spring members of the assembly 1 are formed by the hook members 63. Furthermore, it is also possible for the hook members 63 to be of rigid design and the arms 66 to be deformable, in which case the spring members of the assembly 1 are formed by the arms 66.

The spring force generated by the spring members ensures that after the fitter releases the actuating members 74, the bearing element 2 and the anchoring part 4 are moved towards one another so that a clamping action on the flanges of the profiled element results. The clamping action of the one or more spring members is preferably such that it is possible to move the assembly 1 along the profiled element by hand in such a manner that the assembly 1 can be positioned in the desired location on the profiled element in a simple manner.

Due to the bearing element 2 and the anchoring part 4 being moved towards one another by the spring members, the wedge element 75 is pushed away laterally as a result of the pressure from the anchoring part 4 on the wedge face 76.

Furthermore, the spring force generated in the spring lip 77 by the deformation thereof while being pushed inwards results in a restoring force, as a result of which the wedge element 75 between the bearing element 2 and the anchoring part 4 is pulled out when the fitter releases the actuating members. In the pre-fitting state, the wedge element 75 is situated between the flanges of the profiled element.

Each of the actuating members 74 is furthermore provided with a blocking lug 78 which, in the pre-fitted state, is situated against or near one of the flanged edges of the profiled element. The blocking lug 78 ensures that the securing assembly 1 cannot be rotated out of the pre-fitting state unless the anchoring part 4 is moved downwards with respect to the bearing element 2 by pushing in the actuating members 74, so that the blocking lug 78 can be lifted over the top surface of the flange and the assembly 1 can be rotated. In the illustrated embodiment, a blocking lug 78 is provided on one side of each actuating member 74 so that one direction of rotation of the securing assembly is blocked as a result. The other direction of rotation is blocked as a result of the specific shape of the anchoring part 4. However, it is also conceivable to provide blocking lugs in order to block two directions of rotation.

Figure 6:
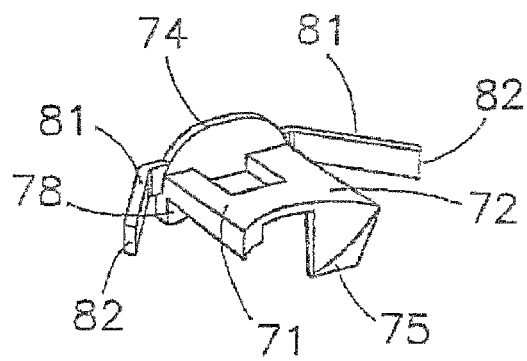
FIG. 6 shows a perspective view of an operable body of an alternative of the embodiment from FIG. 1, FIGS. 7-10 show a perspective view, a side view, a top view and a front view, respectively, of another preferred embodiment of a securing assembly according to the invention.
Figure 7:
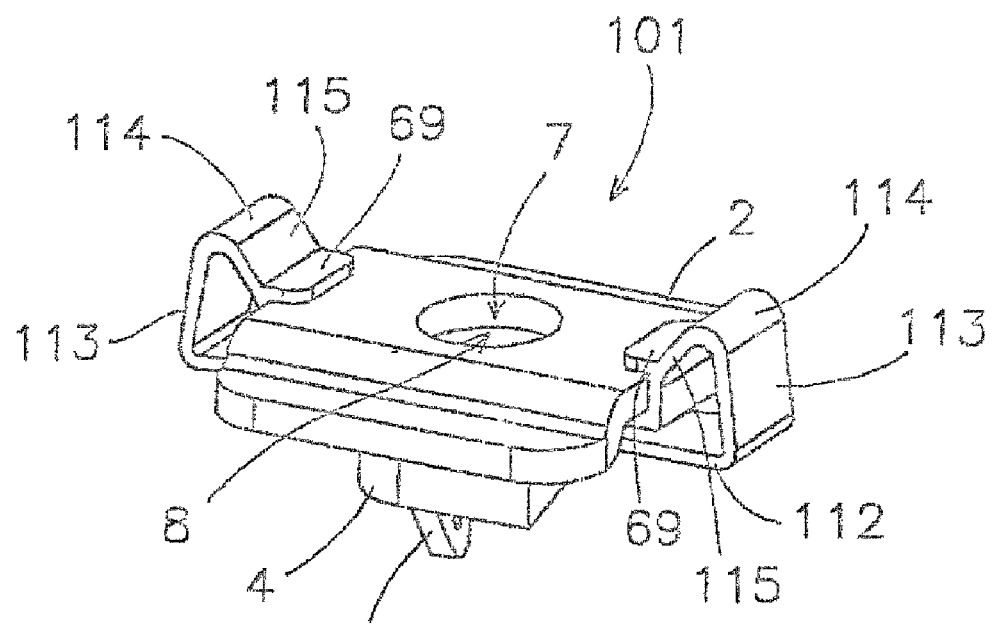
Figure 8:
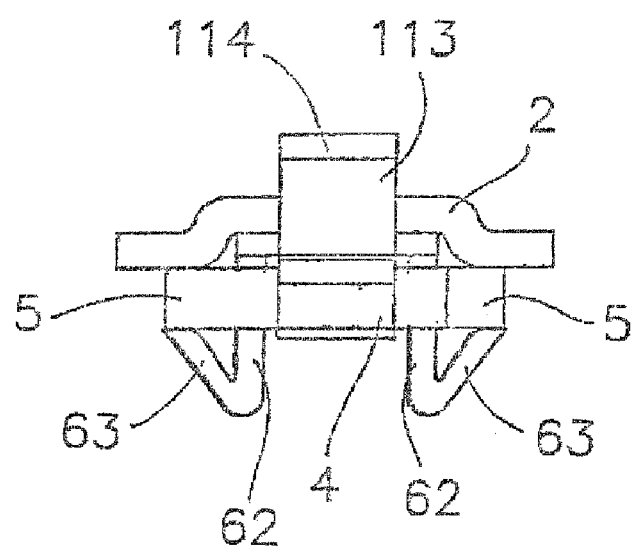
Figure 9:
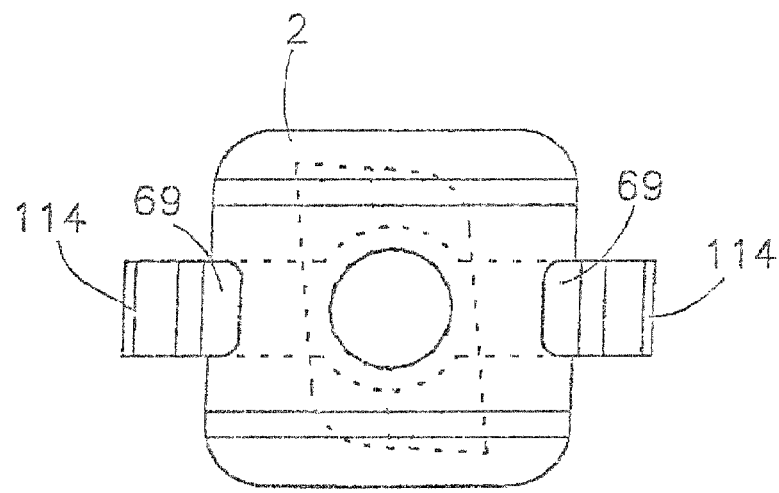
Figure 10:
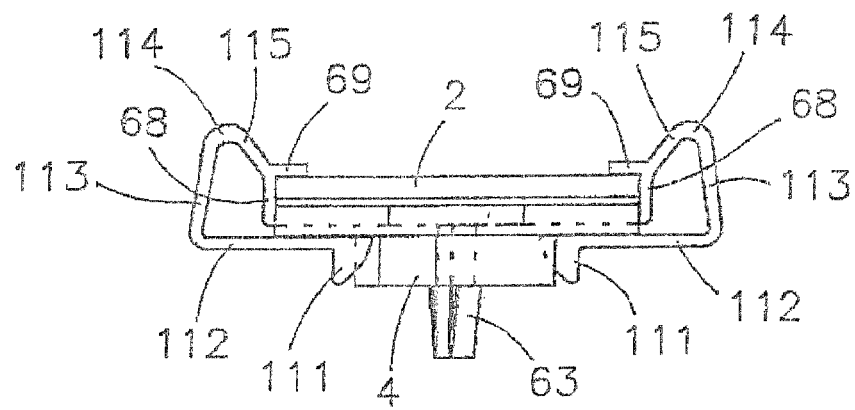

FIG. 6 shows an alternative embodiment of an operable body 80 of a wedge mechanism which substantially corresponds to the operable element 70 from FIG. 1. Instead of a spring lip 77 which engages with the end edge 68 of the support 6, the operable body 80 has two spring lips 81 which extend laterally and obliquely from the actuating member 74 and at an acute angle to the legs 71, 72 in the direction of the bearing element 2 in order to rest on the edge of the bearing element 2 at their respective ends 82.

Figure 11:
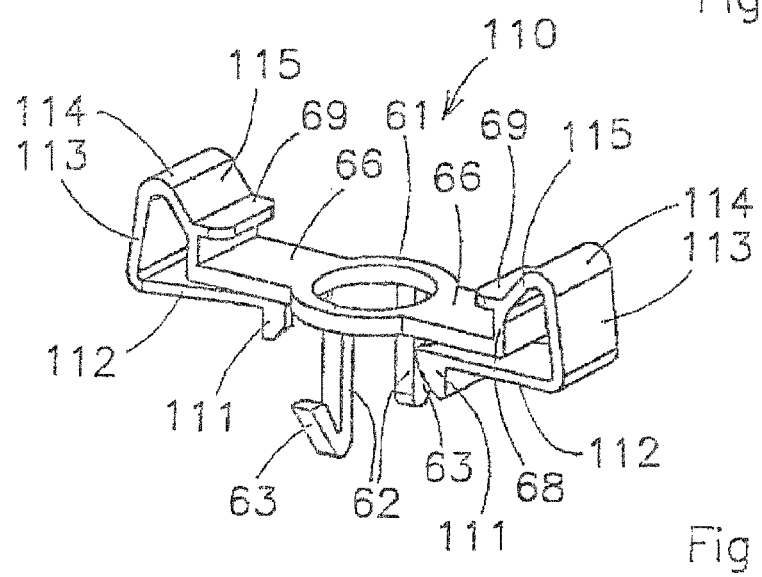
FIG. 11 shows a perspective view of a support of the securing assembly from FIG. 7, FIGS. 12 and 13 show a perspective view and a side view, respectively, of yet another preferred embodiment according to the invention.

FIGS. 7-10 show another preferred embodiment of a securing assembly according to the invention. This securing assembly which is denoted overall by reference numeral 101, shows great similarities in design and operation with the above-described embodiments and identical parts are therefore denoted by the same reference numerals. FIG. 11 shows the support 110 of the securing assembly 101 separately. Parts of the support 110 which are identical to parts of the support 6 illustrated in FIG. 5 are denoted by the same reference numerals and reference is made to the description of support 6 associated with FIG. 5 for a description thereof.

The support 110 furthermore has wedge elements 111, each of which is provided at the end of a leg 112. The leg 112 extends substantially parallel to and partially under the arm 66. From the other end of the leg 112 the operating surface 113 extends upwards preferably at right angles. By means of a sprung bending hinge 114, the top end of the operating surface 113 is connected to a connecting part 115 which extends obliquely downwards from the bending hinge 114 in the direction of the gripping lip 69 and is connected to the latter. Thus, a wedge mechanism, comprising the restoring spring members 114, the wedge element 111 and the actuating members 113, is formed integrally with the support. The support 110 is preferably made from plastic. The operational principle of this embodiment is similar to that of the embodiments which have already been described above. It should be noted that with this embodiment, the actuating members are not provided with blocking lugs in order to prevent rotation of the assembly 101. In this embodiment the wedge elements 111, which are situated between the flanged edges in the pre-fitting state, will block the rotation when they abut the flanged edges of the profiled element during rotation.

Figure 12:
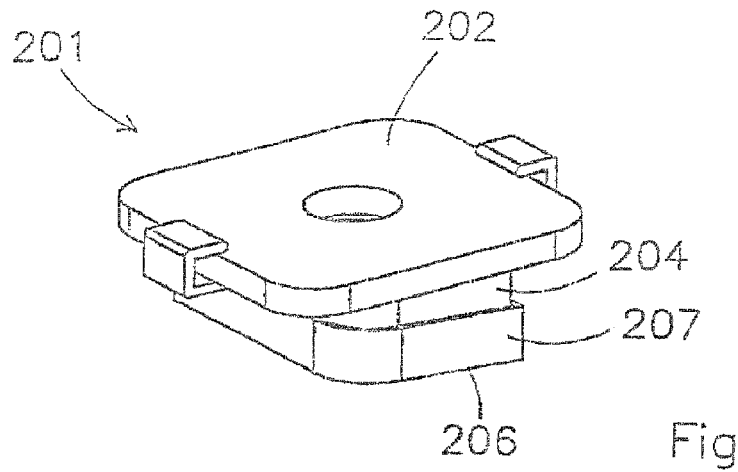
Figure 13:
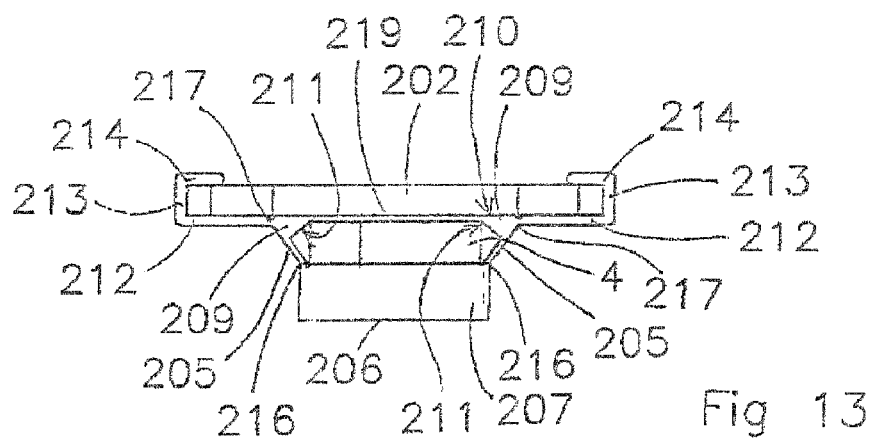
Figure 14:
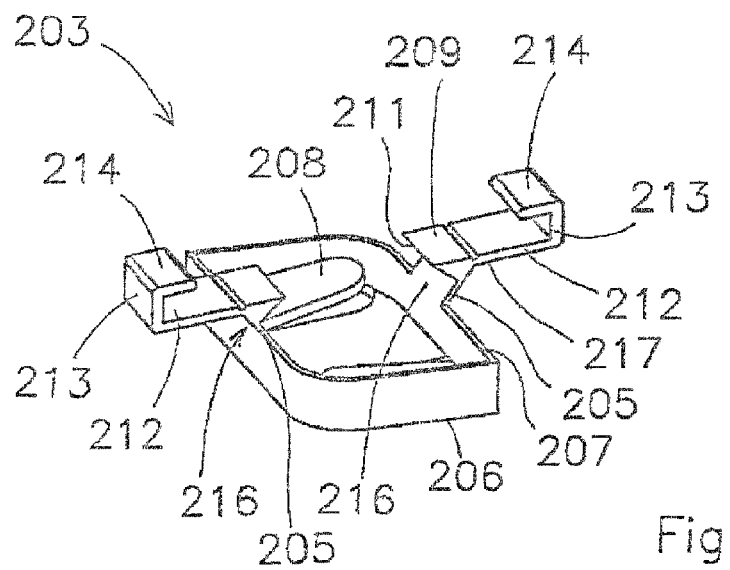
FIGS. 14 and 15 show a perspective view and a top view, respectively, of a support of the securing assembly from FIG. 14.
Figure 15:
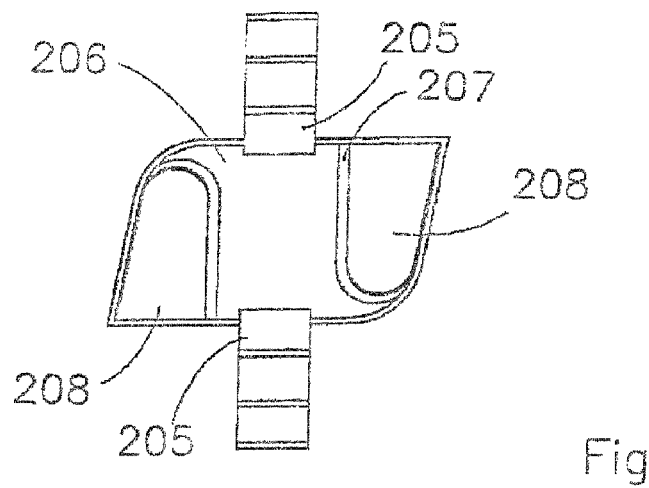

FIGS. 12 and 13 show a securing assembly 201 which in this case, has a completely flat bearing element 202 and an anchoring part 204. The assembly 201 furthermore comprises a support 203 which is shown separately in FIGS. 14 and 15 and which is preferably produced in one piece from plastic. The support 203 has legs 205, each of which extends along a longitudinal side of the anchoring part 204 and which are arranged opposite one another. The support 203 furthermore has a bottom 206 with an upright peripheral edge 207 which bottom 206 with peripheral edge 207 connects the bottom ends of the legs 205 to one another. The legs 205 are connected to the edge 207 at a hinge axis 216. The bottom 206 extends underneath the anchoring part 204 and the peripheral edge 207 extends around the periphery of the anchoring part 204 so that the latter is locked in the transverse direction. Spring lips 208 project upwards from the bottom 206 and engage with the anchoring part 204. In the case illustrated here, the spring lips 208 are formed integrally with the bottom 206. However, it is also possible to arrange a separate spring element with spring members on the bottom so as to engage with the anchoring part 204.

At the top end of the legs 205, a wedge element 209 is in each case provided, a top surface 210 of which engages with the bearing element 202 and a bottom wedge face 211 of which engages with the edge of the anchoring part 204. At the top end of the legs 205, an arm 212 is by means of an integral hinge 217 or the like to an upright end edge 213 which extends along the bearing element 202 substantially at right angles with respect to the arm 212. At the top end of the end edge 213, there is a gripping lip 214 which grips over the edge of the bearing element 202 and holds the latter. Thus, the arms 212 with the upright edge 213 and the gripping lips in this embodiment serve as coupling members.

In this embodiment, the wedge mechanism is an integral part of the support. With the securing assembly 201, the upright end edges 213 serve as actuating members for operating the wedge mechanism. When the fitter positions the securing assembly 201 against a profiled element and pushes the operating surfaces 213 towards one another between his thumb and index finger, the arms 205 are pivoted inwards, hinging about hinge axis 216, as a result of which the wedge element 209, by means of the wedge face 211, applies a downwards force on the anchoring part 204, the bottom side of which is pushed against the bottom 206 counter to the spring force of the spring members 208. As a result, the distance 219 between the bearing element 202 and the upper side of the anchoring part 204 is increased and the securing assembly can be rotated so that the flanges of the profiled element can be accommodated in the accommodation spaces in the same manner as described above with reference to FIGS. 1-5. When the operating surfaces 213 are then released, the arms 205, as a result of the resilience of the material, pivot back at hinge 216, so that the hinge 216 thus forms a restoring spring.

Figure 16:
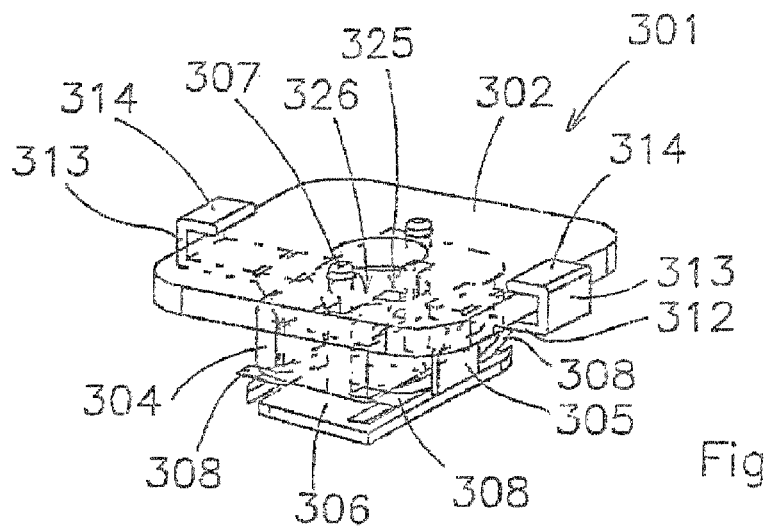
FIG. 16 shows a perspective view of yet another preferred embodiment according to the invention.

FIG. 16 shows a securing assembly 301 which, in this case, has a completely flat bearing element 302 and an anchoring part 304. The anchoring part 304 has a preferably threaded central bore 325. Adjoining the bore 325, two apertures 326 are provided which extend through the anchoring part 204.

Figure 17:
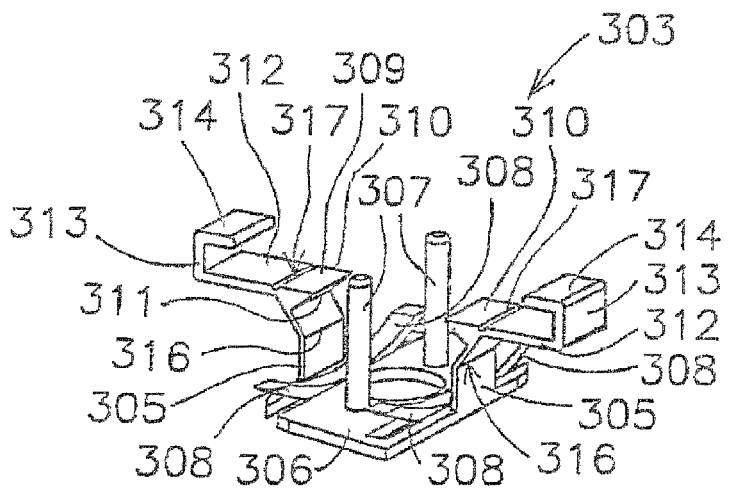
FIG. 17 shows a perspective view of a support of the securing assembly from FIG. 16.

The assembly 301 furthermore comprises a support 303 which is shown separately in FIG. 17 and which is preferably produced in one piece from plastic. The support 303 has legs 305 located opposite one another, each of which extends along a longitudinal side of the anchoring part 304 and is bent at a hinge axis 316. The support 303 furthermore has a bottom 306, which bottom 306 connects the bottom ends of the legs 305 to one another. The bottom 306 extends underneath the anchoring part 304. Spring members 308 project from the bottom 306 upwards and engage with the bottom side of the anchoring part 304. In the case illustrated here, the spring members 308 are formed integrally with the bottom 306.

However, it is also possible to provide a separate spring element with spring members on the bottom in order to engage with the anchoring part 304.

Furthermore, pins 307 extend from the bottom which are accommodated in the apertures 326 in the anchoring part 304. The pins 307 secure the anchoring part 304 in the transverse direction, but allow the anchoring part 304 to be displaced in the axial direction past the pins 307.

At the top end of the legs 305, a wedge element 309 is provided in each case, a top surface 310 of which engages with the bearing element 302 and a bottom wedge face 311 of which engages with the edge of the anchoring part 304. At the top end of the legs 305, an arm 312 is by means of an integral hinge 317 or the like to an upright end edge 313 which extends along the bearing element 302 substantially at right angles with respect to the arm 312. At the top end of the end edge 313, a gripping lip 314 is in each case provided which grips over the edge of the bearing element 302 and holds the latter. Thus, the arms 312 with the upright edge 313 and the gripping lips 314 in this embodiment serve as coupling members.

With the securing assembly 301, the upright end edges 313 serve as actuating members for the wedge mechanism which is therefore an integral part of the support. When the fitter positions the securing assembly 301 against a profiled element and pushes the actuating members 313 towards one another between his thumb and index finger, the arms 305 are pivoted inwards, hinging about hinge axis 316, as a result of which the wedge element 309, by means of the wedge face 311, applies a downwards force on the anchoring part 304, the bottom side of which is pushed against the bottom 306 counter to the spring force of the spring members 308. As a result, the distance between the bearing element 302 and the upper side of the anchoring part 304 is increased and the securing assembly 301 can be rotated so that the flanges of the profiled element can be accommodated in the accommodation spaces in the same manner as described above with reference to FIGS. 1-5. When the operating surfaces 313 are then released, the arms 305, as a result of the resilience of the material, pivot back at hinge 316, so that the arm 305 at the hinge 316 thus forms a restoring spring.

What is claimed is:

1. Securing assembly for securing an object to a C-profile type profiled element with flanges which delimit a longitudinal slot between them, said securing assembly comprising:
   a metal bearing element which has a bearing face which is designed to bear against the outside of the C-profile type profiled element,
   an elongate metal anchoring part which is situated on the bottom side of the bearing face of the bearing element and has axial end parts,
   a support for the anchoring part, said support being provided with one or more spring members, said support supporting the anchoring part resiliently in such a manner that the anchoring part can be moved up and down with respect to the bearing element,
   an accommodation space defined between the bearing element and each axial end part of the anchoring part, said accommodation space being accessible from the side of the securing assembly and designed for accommodating a flange of the C-profile type profiled element, in such a manner that the securing assembly and its anchoring part can be aligned with the longitudinal slot and the anchoring part can be introduced into the C-profile type profiled element through the longitudinal slot and in such a manner that subsequently, after rotation of the securing assembly, the anchoring part, in a pre-fitting state, extends at an angle with respect to the longitudinal slot, so that the flanges are in the accommodation spaces and the anchoring part grips behind the flanges of the profiled element, with the support clamping the flanges of the profiled element between the anchoring part and the bearing element,
   wherein the securing assembly further comprising a wedge mechanism which is effective between the bearing element and anchoring part, said wedge mechanism comprising at least one wedge element which can be introduced between the bearing element and the anchoring part, said at least one wedge element having a sloping wedge face engaging with the anchoring part in such a manner that when the wedge mechanism is operated, the anchoring part is pushed down with respect to the bearing element and the flanges of the profiled element can be accommodated in the accommodation spaces when the securing element is rotated, wherein two actuating members are arranged opposite one another in order to operate the wedge mechanism, which actuating members can be moved towards one another by a fitter by pressing them together.

2. Securing assembly for securing an object to a C-profile type profiled element with flanges which delimit a longitudinal slot between them, said securing assembly comprising:
   a metal bearing element which has a bearing face which is designed to bear against the outside of the C-profile type profiled element,
   an elongate metal anchoring part which is situated on the bottom side of the bearing face of the bearing element and has axial end parts,
   a support for the anchoring part, said support being provided with one or more spring members, said support supporting the anchoring part resiliently in such a manner that the anchoring part can be moved up and down with respect to the bearing element,
   an accommodation space defined between the bearing element and each axial end part of the anchoring part, said accommodation space being accessible from the side of the securing assembly and designed for accommodating a flange of the C-profile type profiled element, in such a manner that the securing assembly and its anchoring part can be aligned with the longitudinal slot and the anchoring part can be introduced into the C-profile type profiled element through the longitudinal slot and in such a manner that subsequently, after rotation of the securing assembly, the anchoring part, in a pre-fitting state, extends at an angle with respect to the longitudinal slot, so that the flanges are in the accommodation spaces and the anchoring part grips behind the flanges of the profiled element, with the support clamping the flanges of the profiled element between the anchoring part and the bearing element,
   wherein the securing assembly further comprising a wedge mechanism which is effective between the bearing element and anchoring part, said wedge mechanism comprising at least one wedge element which can be introduced between the bearing element and the anchoring part, said at least one wedge element having a sloping wedge face engaging with the anchoring part in such a manner that when the wedge mechanism is operated, the anchoring part is pushed down with respect to the bearing element and the flanges of the profiled element can be accommodated in the accommodation spaces when the securing element is rotated, wherein the wedge mechanism comprises a restoring spring member that is designed to bring the wedge mechanism back to an unoperated state from an operated state.

3. Securing assembly according to claim 2, wherein the wedge mechanism is positioned in such a manner that it can be operated at right angles to the longitudinal axis of the anchoring part.

4. Securing assembly according to claim 2, wherein the wedge element is movably connected to the support.

5. Securing assembly according to claim 2, wherein the restoring spring member is connected to the wedge element in order to withdraw the latter in the operated state from the space between the bearing element and the anchoring part.

6. Securing assembly according to claim 2, wherein the support is provided with legs, each of which extends in a direction away from the bearing element up to a bottom end of the respective leg situated under the anchoring part.

7. Securing assembly according to claim 6, wherein the anchoring part is provided with apertures through which the legs extend.

8. Securing assembly according to claim 7, wherein the apertures in the anchoring part adjoin a bore provided in the anchoring part.

9. Securing assembly according to claim 6, wherein the bottom end of at least one of the legs is provided with the spring member, which spring member grips behind the bottom side of the anchoring part.

10. Securing assembly according to claim 2, wherein the support has legs, each of which extends along a longitudinal side of the anchoring part.

11. Securing assembly according to claim 2, wherein the support has a bottom which connects the bottom ends of the legs to one another, and which extends under the anchoring part.

12. Securing assembly according to claim 11, wherein the one or more spring members project upwards from the bottom and engage with the anchoring part.

13. Securing assembly according to claim 2, wherein the support comprises an annular body which is connected to the bearing element by means of coupling members and from which the legs extend.

14. Securing assembly for securing an object to a C-profile type profiled element with flanges which delimit a longitudinal slot between them, said securing assembly comprising:

a metal bearing element which has a bearing face which is designed to bear against the outside of the C-profile type profiled element, an elongate metal anchoring part which is situated on the bottom side of the bearing face of the bearing element and has axial end parts, a support for the anchoring part, said support being provided with one or more spring members, said support supporting the anchoring part resiliently in such a manner that the anchoring part can be moved up and down with respect to the bearing element, an accommodation space defined between the bearing element and each axial end part of the anchoring part, said accommodation space being accessible from the side of the securing assembly and designed for accommodating a flange of the C-profile type profiled element, in such a manner that the securing assembly and its anchoring part can be aligned with the longitudinal slot and the anchoring part can be introduced into the C-profile type profiled element through the longitudinal slot and in such a manner that subsequently, after rotation of the securing assembly, the anchoring part, in a pre-fitting state, extends at an angle with respect to the longitudinal slot, so that the flanges are in the accommodation spaces and the anchoring part grips behind the flanges of the profiled element, with the support clamping the flanges of the profiled element between the anchoring part and the bearing element, wherein the securing assembly further comprising a wedge mechanism which is effective between the bearing element and anchoring part, said wedge mechanism comprising at least one wedge element which can be introduced between the bearing element and the anchoring part, said at least one wedge element having a sloping wedge face engaging with the anchoring part in such a manner that when the wedge mechanism is operated, the anchoring part is pushed down with respect to the bearing element and the flanges of the profiled element can be accommodated in the accommodation spaces when the securing element is rotated, wherein the support and the wedge mechanism are produced in one piece.

\* \* \* \* \*